Patented Oct. 29, 1946

2,410,096

UNITED STATES PATENT OFFICE 2,410,096

METHOD OF PREPARING HIGH MOLECULAR WEIGHT ALIPHATIC KETONES

Ronald E. Meyer and Ferdinand P. Otto, Woodbury, N. J., assignors to Socony-Vacuum Oil Company, Incorporated, a corporation of New York No Drawing. Application June 12, 1943, Serial No. 490,682

5 Claims. (Cl. 260—595)

This invention has to do with an improved catalytic method for the preparation of substantially pure ketones from unsaturated high molecular weight fatty acids.

Several attempts have been made in the past to prepare substantially pure ketones by heating fatty acids at relatively high temperatures in the presence of various catalysts. For example, Esterfield and Taylor, in the J. C. S. 99, 2298 (1911), have disclosed that substantially pure ketones in high yields can be obtained by subjecting high molecular weight fatty acids to relatively high temperatures in the presence of various metal catalysts. Their method, however, was unsatisfactory for the preparation of ketones from high molecular weight unsaturated fatty acids. When such unsaturated acids were used, a black tarry reaction mass was obtained and from this mass only 10 per cent of ketone was obtained. It was found that it was quite difficult to remove the metal catalyst and the ketone from the black tarry reaction mass. This may be attributed to the fact that Esterfield and Taylor carried out their reaction in a loosely covered reaction vessel in which air was present. Apparently the air (or oxygen in the air) present in the reaction vessel was sufficient to induce the formation of deleterious, amorphous and tar-like by-products thus militating against the formation of the desired ketone. Tressler in Patent 1,941,640 has disclosed that some of the shortcomings of the aforesaid procedure can be overcome by using a non-oxidizing or inert gas in the reaction. Tressler accomplished this by making use of a reaction vessel having an inlet and outlet means so related that a non-oxidizing gas, as carbon dioxide, could be continuously introduced into the reaction vessel to sweep out any air or oxygen present in the vessel. As pointed out by Tressler, some carbon dioxide is evolved in the reaction, but the amount, it is said, is insufficient for the maintenance of the non-oxidizing conditions required. The ketones obtained by Tressler from high molecular weight unsaturated fatty acids, however, are dark and are, in fact, darker than the fatty acid used. Accordingly, the ketones obtained by the Tressler process are relatively impure.

This invention is predicated upon the discovery that light-colored ketones can be obtained in high yields by heating high molecular weight unsaturated fatty acids in the presence of certain metal of the type described hereinbelow, at relatively high temperatures and in the presence of the gases evolved. More specifically, this invention is based upon the discovery that the gases evolved by so treating said acids are sufficiently non-oxidizing in character that they may be utilized to prevent or retard undesirable side-reactions from taking place. It has been found that water vapor and carbon dioxide are evolved together with nascent hydrogen, and it is believed that it is the nascent hydrogen which is of primary effectiveness in keeping side-reactions to a minimum and making possible the obtainment of substantially pure, light-colored ketones in high yields. Accordingly, it will be apparent that it is not necessary to introduce any non-oxidizing or inert gas into the reaction vessel in which a high molecular weight unsaturated fatty acid is heated in the presence of a catalyst of the aforesaid type.

The source of the several gases evolved in the conversion of a high molecular weight unsaturated fatty acid to the corresponding ketone will be apparent from the following. As indicated in the references discussed hereinabove, it is generally recognized that water vapor and carbon dioxide are evolved when such an acid is heated. It is also well known to those familiar with the art that nascent hydrogen is formed from water vapor and various active metals. In effect, then, the water vapor from said acid enters into reaction with the catalytic material.

The catalysts or catalytic materials which serve the purposes of this invention are defined herein as those active metals which react with water to liberate nascent hydrogen. These catalysts may also be designated as ketone-forming catalysts. Illustrative of such metals are the alkalies, alkaline earths and the following: lead, tin, aluminum, iron, nickel and cobalt. Particularly preferred of such metals is iron. Contemplated also as metal catalysts are certain alloys which will react with water to form nascent hydrogen, typical of which are lead-sodium, mercury-sodium, mercury-magnesium, mercury-aluminum and zinc-copper.

While the amount of catalyst may be varied considerably, it has been found that satisfactory results are obtained with from 1 to 10 per cent. In general, however, 5 per cent of catalyst is sufficient. The amount of catalyst used and the reaction time are related, inasmuch as longer time is required to complete the reaction when a comparatively small amount of catalyst is used. It has also been found that superior results are obtained when the catalyst used is in a finely divided state, as illustrated by powdered iron.

Elevated temperatures below the destructive distillation temperature of the acid so treated are used herein, preference being given to temperatures within the range of 300° C. to 350° C.

Pressure is a necessary adjunct of the present method in order to maintain the reaction in an atmosphere of the evolved gases. In this regard, a positive pressure contributed by the gases evolved in the reaction is satisfactory. While relatively high pressures of the order of 200 pounds per square inch or more may be used herein, we have found that pressures as low as a few pounds per square inch, such as 10 to 50 pounds per square inch are satisfactory.

As aforesaid the acids used herein are unsaturated high molecular weight fatty acids, preferably containing at least about 12 carbon atoms. Typical and particularly preferred of such acids is oleic acid. Although the present method is particularly directed to the production of ketones from the aforesaid acids, it may also be used for the production of ketones from a mixture of saturated and unsaturated acids.

The present method is carried out in a closed vessel which is equipped with a suitable means for regulating the pressure developed by the gases evolved therein. For example, a pressure relief valve may be used for this purpose, such a valve being regulated to open at a desired pressure and thereby release a portion of the gases present in the reaction vessel. A valve of this type is particularly desirable in that it provides a means for permitting the gases to escape at a rate such that foaming of the reaction mixture is kept to a minimum. In this way, a non-oxidizing or reducing atmosphere is maintained within the reaction vessel until the reaction has been completed. Heat is applied to the reaction vessel and when the temperature rises to about 200–240° C., there is some evolution of gases such as carbon dioxide, water vapor and nascent hydrogen. As indicated above, the gases are removed from the reaction vessel by opening the pressure valve, this step being taken at this time in order to remove any air or oxidizing medium originally present in the reaction vessel. The temperature is thereafter increased slowly to about 300–330° C., or higher if necessary, and is maintained until the pressure no longer increases; that is, until gases are no longer evolved in the reaction vessel. The reaction vessel is then cooled and the reaction product discharged therefrom. The reaction product may then be filtered through a suitable filter medium. Particularly useful as filter mediums are clays and diatomaceous earths, representative of which is "Super Filtrol." Prior to filtration, the reaction product may be taken up in a suitable diluent or solvent such as benzol, then filtered and said diluent removed from the filtrate by any suitable means, such as distillation. The reaction product so obtained is a ketone of the acid used and has a better color than said acid. That the ketones so obtained are substantially pure is indicated by their iodine numbers. For example, dioleyl ketone or oleone obtained from commercial oleic acid by the foregoing procedure has an iodine number ranging from 90 to 113, generally between 97 to 103. The theoretical iodine number for dioleyl ketone or oleone ($C_{35}H_{66}O$) is 101.

The present method is illustrated by the following examples of the preparation of substantially pure dioleyl ketone, or oleone.

*Example 1*

A quantity, 3175 grams, of commercial grade oleic acid known as White Elaine red oil, was charged to an autoclave equipped with a mechanically-driven stirrer and a pressure relief valve which is set to maintain a positive pressure of a few pounds per square inch at all times. Finely powdered iron, 150 grams, was then stirred into the acid. The reaction vessel was closed and the mixture was stirred and heated. When the temperature rose to about 200° C., the pressure increased rapidly and at about 260° C. the pressure was 70 pounds per square inch. At this time the pressure relief valve opened to release carbon dioxide, steam and nascent hydrogen and any air that may have been present in the vessel. The temperature was increased thereafter to about 330–340° C. and maintained for about 3½ hours. The reaction was substantially complete at this time as shown by no further change in the pressure, indicating that gases were no longer evolved from the reaction mixture. In order to insure complete reaction, however, the temperature of 330–340° C. was maintained for an additional 4 hours. The reaction mixture was cooled, diluted with an equal volume of benzol and then filtered through Super Filtrol clay. Benzol was distilled from the filtrate and the benzol-free reaction product was a pale yellow solid material at room temperature. The weight of this product was 2530 grams which corresponds to a 90 per cent yield. The product had the following physical properties: neutralization number 1.7, A. S. T. M. pour point 85° F., iodine number 91 and hydroxyl number 6.

The hydroxyl number of the product is an indication that a very small amount of alcoholic material is present therein. In all probability this resulted from a partial hydrogenation of the ketone group by the nascent hydrogen which was present during the reaction. This alcoholic material can be separated from the ketone by any suitable method such as distillation, extraction, etc.

*Example 2*

Fifteen hundred grams of commercial grade oleic acid and 75 grams of reduced iron powder (reduced by hydrogen) were charged to a two liter rocking bomb equipped with a pressure releasing valve. The bomb was then tightly closed and heated while shaking. When the temperature rose to about 300° C., the pressure was about 200 pounds per square inch. The pressure reducing valve was then opened in order to release the gases present in the bomb, such gases containing oxygen originally present. The temperature of the reaction mixture in the bomb was maintained at about 325–335° C. for 2 hours. During this time interval, the gases evolved in the reaction, namely, carbon dioxide, water vapor and nascent hydrogen were allowed to escape through said valve at ½ hour intervals, until no further gases were evolved. The reaction mixture was cooled and diluted with an equal volume of benzol and was then passed through a high-speed centrifuge in order to remove the catalyst. The benzol was then separated from the catalyst-free reaction mixture by distillation. The benzol-free reaction product was a pale yellow solid. The weight of the product was 1215 grams corresponding to a 91 per cent yield. This product had an iodine number of 101 and a neutralization number of 0.4.

Example 3

Fifteen hundred grams of commercial grade oleic acid and 37.5 grams of reduced iron powder (reduced by hydrogen) were charged to the bomb described in Example 2 and treated as described therein. The amount of iron powder or catalyst used in this example was about 2.5 per cent whereas 5 per cent was used in Example 2. The reaction mixture was heated to 330–340° C. for 7 hours, and the reaction product was worked up as described in said example. A pale yellow solid product was thus obtained and it had the following properties: neutralization number 0.8, iodine number 103 and hydroxyl number 15.

Example 4

Three hundred grams of commercial grade oleic acid and 3 grams of reduced iron powder were charged to a 500 milliliter shaker bomb equipped as described in Example 2. The procedure was substantially the same as that described in said example, with the exception that only 1 per cent of iron powder was used herein for the catalyst. The reaction mixture was heated to 325–350° C. for a 7 hour period. The reaction mixture was cooled, diluted with an equal volume of benzol and filtered to remove any large iron particles. The filtrate was washed thoroughly with dilute hydrochloric acid to remove any colloidal particles of iron and then washed with water to remove the excess hydrochloric acid. The water-washed reaction product was then distilled under reduced pressure to a maximum temperature of about 175° C. to remove benzol therefrom. In this way, a pale yellow product was obtained. It had the following physical properties: neutralization number 3.8, iodine number 113 and hydroxyl number 13.

It is to be understood that the foregoing examples are merely illustrative and that this invention includes within its scope such changes and modifications as fairly come within the spirit of the appended claims.

We claim:

1. The method of preparing dioleyl ketone from oleic acid which comprises heating said acid at an elevated temperature above about 300° C. and below the destructive distillation temperature of said acid in the presence of an active metal which reacts with water to produce nascent hydrogen at said temperature and in a non-oxidizing atmosphere of substantially only evolved gases with a positive pressure produced by substantially only said gases.

2. The method of preparing dioleyl ketone from oleic acid which comprises heating said acid at an elevated temperature between about 300° C. and about 350° C. in the presence of finely divided iron powder in the presence of a non-oxidizing atmosphere of substantially only evolved gases containing nascent hydrogen and with a positive pressure produced by substantially only said gases.

3. In the method of preparing a ketone from a high molecular weight unsaturated fatty acid at an elevated temperature in the presence of an active metal which reacts with water to produce nascent hydrogen at said temperature, the improvement which comprises preparing said ketone in a non-oxiding atmosphere of substantially only evolved gases under a positive pressure produced by said gases.

4. In the method of preparing dioleyl ketone from oleic acid at an elevated temperature in the presence of an active metal which reacts with water to produce nascent hydrogen at said temperature, the improvement which comprises preparing said dioleyl ketone in a non-oxidizing atmosphere of substantialy only evolved gases containing nascent hydrogen under a positive pressure produced by said gases.

5. In the method of preparing dioleyl ketone from oleic acid at an elevated temperature in the presence of a catalytic amount of finely-divided iron powder, the improvement which comprises preparing said dioleyl ketone in a non-oxidizing atmosphere of substantially only evolved gases containing nascent hydrogen under a positive pressure produced by said gases.

RONALD E. MEYER.
FERDINAND P. OTTO.